United States Patent
Martinelli et al.

(10) Patent No.: US 6,941,032 B2
(45) Date of Patent: Sep. 6, 2005

(54) PASSIVE POLARIZATION STABILIZER

(75) Inventors: Mario Martinelli, San Donato Milanese (IT); Paolo Martelli, Milan (IT); Angelo Barberis, Cambiago (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 368 days.

(21) Appl. No.: 09/883,241

(22) Filed: Jun. 19, 2001

(65) Prior Publication Data

US 2002/0037126 A1 Mar. 28, 2002

Related U.S. Application Data

(60) Provisional application No. 60/214,501, filed on Jun. 27, 2000.

(30) Foreign Application Priority Data

Jun. 21, 2000 (EP) .............................................. 00305236

(51) Int. Cl.$^7$ .............................. G02B 6/27; G02B 6/12; G02B 6/26
(52) U.S. Cl. .............................. 385/11; 385/14; 385/22; 385/27; 385/39
(58) Field of Search .............................. 385/11, 14, 15, 385/16–17, 19–22, 24, 27, 39; 356/453

(56) References Cited

U.S. PATENT DOCUMENTS 3,728,030 A * 4/1973 Hawes ........................ 356/453

FOREIGN PATENT DOCUMENTS

| EP | 0 394 605 A2 | 10/1990 |
| GB | 2 174 505 A | 11/1986 |

OTHER PUBLICATIONS

T. Shintaku et al., "Polarisation–Independent Optical Isolator Based on Anti–Symmetric Field Conversion", Electronics Letters, vol. 33, No. 20, pp. 1723–1724, (1997).
I. Masaru et al., "Method for Compensating Polarization of Signal Light and Light Amplification Method", Patent Abstracts of Japan of JP 08248358A, Sep. 27, 1996.
H.G. Jerrard, "Modern Description of Polarized Light: Matrix Methods", Optics and Laser Technology, pp. 309–319, (1982).

* cited by examiner

*Primary Examiner*—Frank G. Font
*Assistant Examiner*—Michael P. Mooney
(74) *Attorney, Agent, or Firm*—Finnegan, Henderson, Farabow, Garrett & Dunner, L.L.P.

(57) ABSTRACT

In an interferometer configuration, a retarder in the form of a half-wave plate (125) and a phase shifter in the form of a glass plate (120) are arranged in one arm (114). The phase shifter provides an optical path difference between the interferometer arms which needs to be greater than the coherence length of the input light to be polarization stabilized. A polarizer in the form of a linear polarizer (118) aligned at 45° to the half-wave plate is arranged across both interferometer arms (114 & 116). Polarization stabilization action is achieved by the retarder in combination with the polarizer. More specifically, for at least one input polarization state, the polarization states in the two interferometer arms are rendered orthogonal by the retarder, the polarizer being aligned to allow only one of the two orthogonal states to be transmitted, the other being absorbed. The device is expected to find application for WDM networks based on broadband sources, such as superluminescent diodes. The device is also expected to be useful for providing a front-end polarization stabilization of the signal supplied to optical elements that are sensitive to the polarization state of their input. Examples of such elements are semiconductor optical amplifiers, integrated optical splitters and electro-optical switches.

17 Claims, 6 Drawing Sheets

PASSIVE POLARIZATION STABILIZER

CROSS REFERENCE TO RELATED APPLICATION

This application claims the benefit of U.S. Provisional Application No. 60/214,501, filed Jun. 27, 2000, which is incorporated by reference herein, and claims the right to priority based on European Application No. 0305236.2 filed Jun. 21, 2000.

BACKGROUND ART

The invention relates to a passive polarization stabilizer and applications thereof in optical systems and sub-systems.

Polarization stabilization is required in many applications. For example, low-loss telecommunications optical fiber is not polarization preserving. Consequently, light emerging from such fiber will have an undefined polarization state. On the other hand, many devices which may be arranged to receive light from an optical fiber are sensitive to the polarization state of the input light. Examples of such polarization sensitive devices are semiconductor optical amplifiers (SOA's), interferometric fiber sensors, electro-optical modulators, wavelength division multiplexing couplers and electro-optical switches based on electro-optic crystals or liquid crystals. The use of polarization preserving fiber can solve the problem, but is often unattractive since polarization preserving fiber is relatively costly and has higher loss, and may not even be possible for many telecommunications applications where devices must be compatible with existing installed fiber.

To provide polarization stabilization, many types of active polarization stabilizers are available. By active it is meant that an element of the device is controlled according to a feed-back (or feed-forward) signal derived from a signal indicative of the polarization state. Active polarization stabilizers are known that control a birefringent element or a Faraday rotator based on a feed-back signal. However, for many telecommunications networks, active devices are to be avoided if possible in view of reliability issues and the need to supply power to the device.

Passive polarization stabilizers would thus, in principal, be attractive devices for many applications. For example, a passive polarization stabilizer could be used as a component in a passive optical network. Generally speaking, a passive device can be expected to be more reliable and less complex and costly than a comparable active device.

At the present time, the inventors know of no commercially available passive polarization stabilizer.

A polarization stabilizer is proposed in JP-A-8248358 (reference [1]). However, it is not understood how this proposed device could possibly function in practice, because its design does not take account of the fact that the phase difference between the two beams at the end of the arms (optical transmission lines 3-1, 3-2) is dependent on the input polarization state. The interference of these beams on recombination (at optical muliplexer 2) would produce an output power that is dependent on the input polarization state. The polarization stabilization function would therefore not be achieved.

SUMMARY OF THE INVENTION

According to a first aspect of the invention there is provided a polarization stabilizing device comprising:

an input light path for receiving a light signal having an undefined polarization state;

a divider arranged in the input light path to split the light signal into first and second components;

a first interferometric arm arranged to receive from the divider the first component of the light signal;

a second interferometric arm arranged to receive from the divider the second component of the light signal;

an output path for outputting the light signal from the first and second interferometric arms;

at least one polarizer arranged either in the first and second interferometric arms, or in the output path, to define an output polarization state for the light signal; and at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer.

The polarization stabilizing device is purely passive and is based on interferometric principals. There is no active feed-back mechanism of any kind. The polarization stabilizing device may be attractive for use in an optical network, especially a passive optical network.

With this arrangement, at a particular input polarization state (or its orthogonal state), the two polarization states at the ends of the interferometric arms are orthogonal to each other, with one being transmitted and the other being eliminated.

Splitting and recombination of the light at the beginning and end of the two interferometric arms is preferably carried out in a manner that is insensitive to the alignment of the input polarization state, and the polarization states in the two arms respectively. Recombination is however sensitive to the relative polarization states in the two interferometric arms, as defined above.

A phase shifter may be provided in one of the first and second interferometric arms to ensure that there is an optical path difference between the first and second interferometric arms that is higher than a coherence length specified for the light signal.

A combiner may be arranged to combine the first and second components of the light signal into the output path.

The at least one polarizer may comprise a polarizing element placed in the output path, a polarizing element placed in both the interferometer arms, or two polarizing elements, one placed in each interferometer arm.

The at least one retarder may comprises a retarding element arranged in either of the interferometer arms, or two retarding elements, one in each arm.

According to a second aspect of the invention there is provided an optical component, comprising: an optical device having an input for receiving an input light signal, the optical device being sensitive to the polarization state of its input signal; and a polarization stabilizing device according to the first aspect of the invention arranged to stabilize the polarization state of the input signal prior to supply to the input of the optical device. The optical device may be a semiconductor optical amplifier (SOA), electro-optic switch or optical splitter.

According to a third aspect of the invention there is provided a method of polarization stabilization, comprising: inputting a light signal into an interferometer arrangement comprising first and second arms having an optical path difference therebetween greater than the coherence length of the light signal; and applying a polarization so that one of the orthogonal polarization states is absorbed while the other is transmitted. The polarization may be applied in both the first and second arms, or subsequent to recombination of the light signal after the first and second arms.

The optical path difference between the arms of the interferometer needs to be greater than the coherence length of the light signal being stabilized. Generally for low-coherence light a relatively small optical path difference will suffice, whereas for a high-coherence light, a greater optical path difference will be needed.

For example, a light source having a center wavelength of 1550 nm and a bandwidth of 2 nm has a coherence length of 1.2 mm. In that case, an optical path difference of 1 cm between the interferometer arms will be satisfactory. The polarization stabilizing device and method can be incorporated into an optical communication system that uses a broadband light source in order to avoid polarization noise at the receiver. The polarization stabilizer can conveniently be placed after a transmission link made of standard telecommunications fiber on the input side of a polarization sensitive element. Polarization stabilization is beneficial in this position, since the local birefringence of standard telecommunications fiber is randomly time varying as a result of thermal and mechanical perturbations. Light emitted from the end of a transmission fiber thus generally has a polarization state showing random temporal fluctuations. Without polarization stabilization, the randomly varying polarization state will cause degradation of receiver performance. More specifically, the random variation of polarization will result in a random variation in the intensity output from polarization sensitive optical devices in the receiver.

Broadband light may find application in wavelength division multiplex (WDM) systems in which broadband light from a single source is spectrum-sliced by a WDM demultiplexer. One example of a suitable broadband source is a superluminescent diode (SLD). Another example is amplified spontaneous emission (ASE) from an erbium-doped fiber amplifier (EDFA). In such a system, the broadband light from the broadband source is spectrum-sliced by a WDM demultiplexer. Spectrum-sliced WDM of this kind has potential cost and complexity advantages over a comparable WDM system in which each wavelength channel has a dedicated laser (i.e. narrowband) source.

BRIEF DESCRIPTION OF THE DRAWINGS

For a better understanding of the invention and to show how the same may be carried into effect reference is now made by way of example to the accompanying drawings in which.

DETAILED DESCRIPTION

First Embodiment

Figure 1:
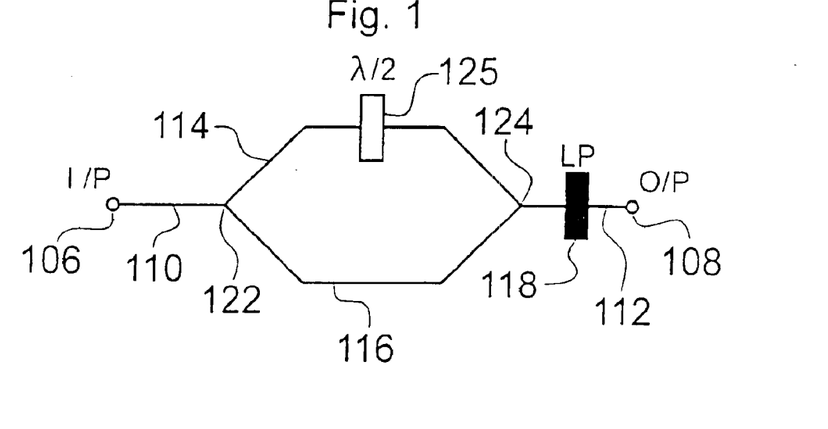
FIG. 1 shows a passive interferometric polarization stabilizer according to a first embodiment of the invention.

FIG. 1 shows a passive polarization stabilizer according to a first embodiment of the invention. The device has the basic structure of a Mach-Zehnder interferometer. Namely, an input light path 110 leads from an input 106 to a divider or splitter 122 which separates the input path 110 into first and second interferometric arms 114 and 116 respectively. The divider or splitter 122 is polarization insensitive, by which it is meant that its performance is substantially unaffected by variation of the input polarization state. The first arm 114 has arranged therein a half-wave plate 125. The two arms of the interferometer then join again at a combiner 124 into an output path 112 which terminates in an output 108. The combiner 124 is polarization insensitive, by which it is meant that its performance is substantially unaffected by variation of the respective absolute alignments of the polarization states of the light signals being recombined, although recombination will be affected by the relative alignment of these polarization states, as is central to operation of the device. Arranged in the output path 112 there is a linear polarizer 118. The axis of the linear polarizer 118 is oriented at +/−45° relative to the principal axis of the half-wave plate 125.

The device delivers an output from the output 108 that has a fixed polarization state defined by the alignment of the linear polarizer 118. Moreover, the output light has substantially constant power, regardless of the polarization state of the input light received at the input 106.

The device is all-passive, having no active components, but nevertheless will deliver an output light signal with defined polarization and constant optical power from an input beam having an arbitrarily time-varying polarization state.

For polarization stabilization to be achieved, it is necessary that the optical path difference between the two interferometer arms 114 and 116 is higher than the coherence length of the light beam. A suitable optical path difference can be provided by inserting some kind of phase-shifting element in one or other of the two interferometer arms. If the envisaged light source is very broadband, then it may not be necessary for any specific phase shifting element to be included. However, in cases where a specific phase shifting element is needed, this may comprise an additional length of optical fiber for a fiber interferometer. Alternatively, for a free-space interferometer, the phase shifter may be a simple glass plate.

The principles of operation of the device of FIG. 1 are now described in more detail in which the azimuth of polarization of the linear polarizer 118 is at 45° and the half wave plate 125 at 0°.

An input optical beam with central frequency $v_o$ and spectral bandwidth $\Delta v$ is now considered. The coherence length of such a beam is $L_c = c/\Delta v$, where c is the speed of light. Moreover, the condition of quasi-monochromaticity is assumed. In other words, it is assumed that the spectral bandwidth is much less than the central frequency so that retardation between the principal axes of the waveplate is nearly π over the entire spectrum of the light beam. The action of the interferometric device on each monochromatic component of the optical beam is described by the following Jones matrix:

$$J = \frac{1}{2}\begin{bmatrix} 1 & 1 \\ 1 & 1 \end{bmatrix}\left\{\frac{1}{2}\begin{bmatrix} i & 0 \\ 0 & -i \end{bmatrix} + \frac{1}{2}e^{i\delta}\begin{bmatrix} 1 & 0 \\ 0 & 1 \end{bmatrix}\right\}, \quad (1)$$

where δ is the phase delay between the two arms of the interferometer and the slow axis is taken to be at 0°. By means of matrix algebra, the expression (1) becomes:

$$J = \frac{1}{4}\begin{bmatrix} e^{i\delta} + i & e^{i\delta} - i \\ e^{i\delta} + i & e^{i\delta} - i \end{bmatrix}. \quad (2)$$

It is then possible to determine the Mueller matrix that represents the device according to the methodology described by Jerrard (reference [2]). Using this methodology, the Jones matrix (2) provides the following expression:

$$M_{ij} = \frac{1}{2}\text{trace}[\sigma_i J \sigma_j J^*],$$

where:

$$\sigma_0 = \begin{bmatrix} 1 & 0 \\ 0 & 1 \end{bmatrix}, \quad \sigma_1 = \begin{bmatrix} 1 & 0 \\ 0 & -1 \end{bmatrix}, \quad \sigma_2 = \begin{bmatrix} 0 & 1 \\ 1 & 0 \end{bmatrix}, \quad \sigma_3 = \begin{bmatrix} 0 & -i \\ i & 0 \end{bmatrix},$$

are the Pauli matrices and J* is the transpose of the complex conjugate of J. Finally, the Mueller matrix of the device is:

$$M = \frac{1}{4}\begin{bmatrix} 1 & \sin\delta & 0 & \cos\delta \\ 0 & 0 & 0 & 0 \\ 1 & \sin\delta & 0 & \cos\delta \\ 0 & 0 & 0 & 0 \end{bmatrix}.$$

The Stokes vector that represents the input optical beam is [1 $s_1$ $s_2$ $s_3$]. It then follows that the output Stokes vector is:

$$M \cdot \begin{bmatrix} 1 \\ s_1 \\ s_2 \\ s_3 \end{bmatrix} = \frac{1}{4}\begin{bmatrix} 1 + s_1\sin\delta + s_3\cos\delta \\ 0 \\ 1 + s_1\sin\delta + s_3\cos\delta \\ 0 \end{bmatrix}. \quad (3)$$

The output linear polarization state is linear with an azimuth of 45°. The output optical power depends on the phase delay between the two arms of the interferometer. This phase delay δ is frequency-dependent according to the following expression:

$$\delta = \frac{2\pi}{c}v\Delta L,$$

where ΔL is the optical path difference between the two arms. The output Stokes vector (3) is also frequency-dependent. Its first element is the power spectral transmission of the interferometric device. The input spectral power density $\rho_{in}(v)$ and the output spectral power density $\rho_{out}(v)$ are then given by the following expression:

$$\frac{\rho_{out}(v)}{\rho_{in}(v)} = \frac{1}{4}[1 + s_1\sin\delta(v) + s_3\cos\delta(v)] \quad (4)$$

To obtain the output optical power for broadband light, the power spectral transmission function (4) is integrated weighted by the input power spectral density $\rho_{in}(v)$:

$$P_{out} = \frac{1}{4}\int[1 + s_1\sin\delta(v) + s_3\cos\delta(v)]\rho_{in}(v)dv$$

The functions sin δ(v) and cos δ(v) have a periodicity c/ΔL (in frequency) and provide a certain number of periods $N_p$ in a given bandwidth Δv, namely:

$$N_p = \frac{\Delta v \Delta L}{c} = \frac{\Delta L}{L_c}$$

If the optical path difference between the two arms ΔL is much higher than the beam coherence length $L_c$ then the integrals of the functions sin δ(v) and cos δ(v) weighted by the input power spectral density $\rho_{in}(v)$ approach zero, since the negative and positive contributions to the integrals cancel out. It therefore results that:

$$P_{out} = \frac{1}{4}P_{in}$$

for ΔL>>$L_c$.

It is noted that the output polarization state is linear with azimuth of 45°, by virtue of the action of the polarizer.

In summary, the above analysis shows that the optical beam at the output of the device has a fixed linear polarization state and, moreover, that the transmitted power is independent of the input polarization state, provided that the condition ΔL>>$L_c$ is satisfied.

Example of First Embodiment

Figure 2:
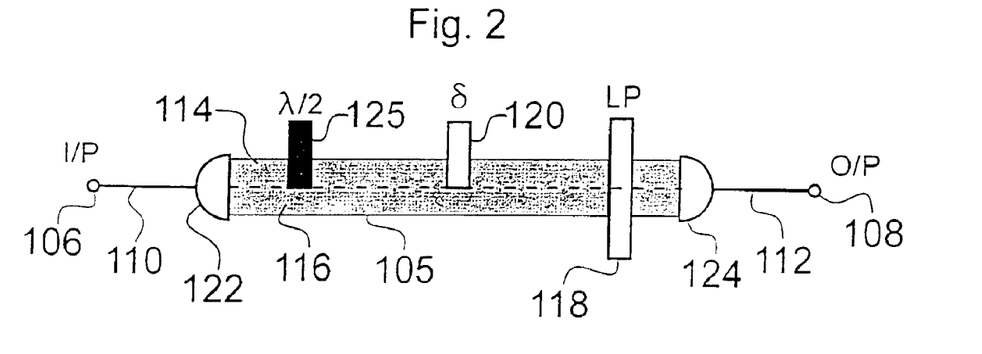
FIG. 2 shows a free-space implementation of the polarization stabilizer of FIG. 1.

FIG. 2 shows a free-space implementation of the device shown in FIG. 1. The interferometric device comprises an input-side optical fiber 110 for receiving an input signal at an input 106. At the output, the device has an output optical fiber 112 terminating in an output 108. The input optical fiber 110 terminates at its other end in a collimating lens 122 which may, for example, be a graded index (GRIN) spherical lens cemented to the end of the optical fiber. Similarly, the output optical fiber 112 terminates at its other end in a further collimating lens 124. The two collimating lenses 122 and 124 define a collimated beam path 105 linking the input and output sides of the device. A half-wave plate 125 is arranged across one-half of the beam path 105 together with a phase shifter 120. The phase shifter 120 is a simple glass plate. The glass plate has a refractive index of 1.5 and a thickness of 1 mm in the specific implementation. The positioning of the half-wave plate 125 and phase shifter 120 thus define one arm of an interferometer by intercepting only a part, specifically one-half, of the beam 105. The subdivision of the collimated beam path 105 into the two interferometric arms is shown schematically in FIG. 2 by the dashed line. A linear polarizer 118 is arranged downstream of the half-wave plate across the full beam path 105, i.e. across both interferometer arms.

The positioning of the polarizer 118 in each of the interferometric arms is functionally the same as arranging a polarizer after the interferometric recombination of the two arms, as illustrated in FIG. 1. The positioning of the polarizer in FIG. 2 was chosen for its simplicity of implementation.

The free-space implementation of the interferometer arms has the advantage of avoiding any birefringence effects, which would degrade the device performance.

The performance of the polarization stabilizer of FIG. 2 is now discussed with reference to FIGS. 3 to 6. The performance was tested using the amplified spontaneous emission (ASE) of an erbium-doped fiber amplifier (EDFA) as the light source.

Figure 3:
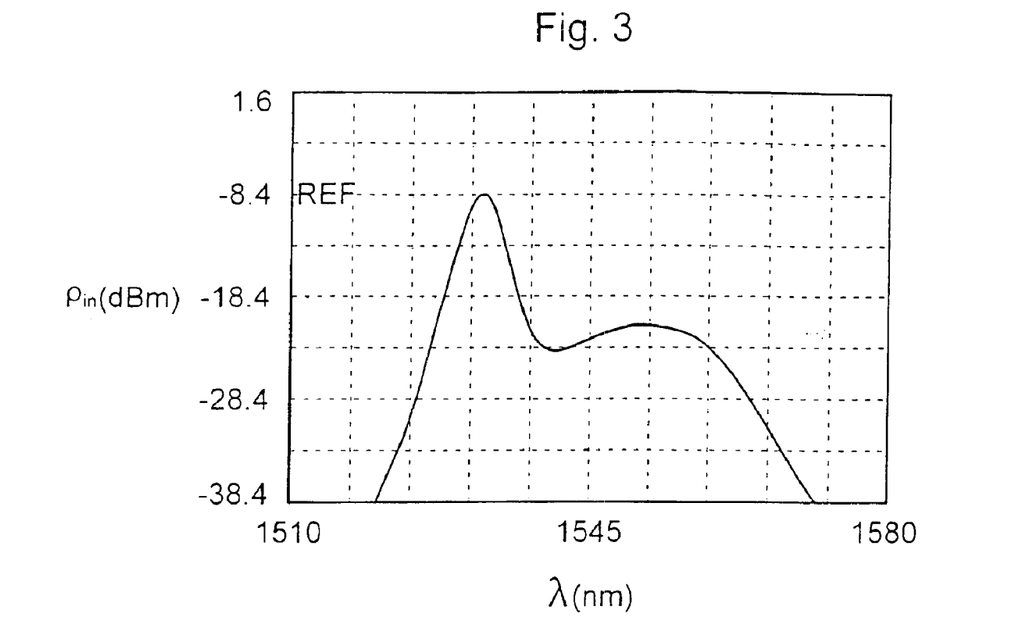
FIG. 3 is a graph of the power spectrum of an input light source for input into the polarization stabilizer of FIG. 2.

FIG. 3 shows the spectral power density of the ASE EDFA light source.

Figure 4:
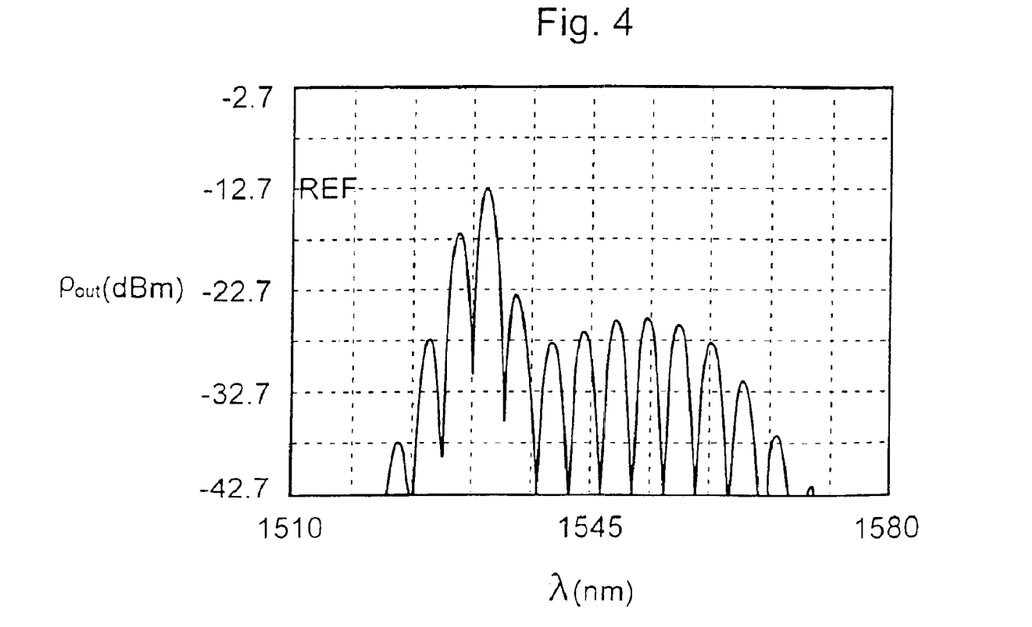
FIG. 4 is a graph of the power spectrum of the light output from the polarization stabilizer of FIG. 2 having received input light power spectrum as shown in FIG. 3.

FIG. 4 shows the corresponding power spectral density at the output of the device. The results are for input light having a linear polarization state with an azimuth of zero degrees. The experimental results are in good agreement with the theory that predicts the following output spectral power density (see equation (4) with $s_1=0$ and $s_3=0$):

$$\rho_{out}(v) = \frac{1}{4}\left[1 + \sin\left(2\pi\frac{\Delta L}{c}v\right)\right]\rho_{in}(v)$$

The output power spectral density $\rho_{out}(v)$ is thus equal to a modulation of the input power spectral density $\rho_{in}(v)$ with period $c/\Delta L$. This period is given in terms of frequency. The corresponding period in wavelength is $\lambda^2/\Delta L$. The wavelength difference between adjacent peaks in FIG. 4 thus gives a value for the optical path difference $\Delta L$ which is equal to 0.54 mm. This optical path difference is defined by the phase shifter 120. Furthermore, the presence of several peaks in the output power spectral density shows that $\Delta L$ is higher than the beam coherence length $L_c$, as is required.

Figure 5:
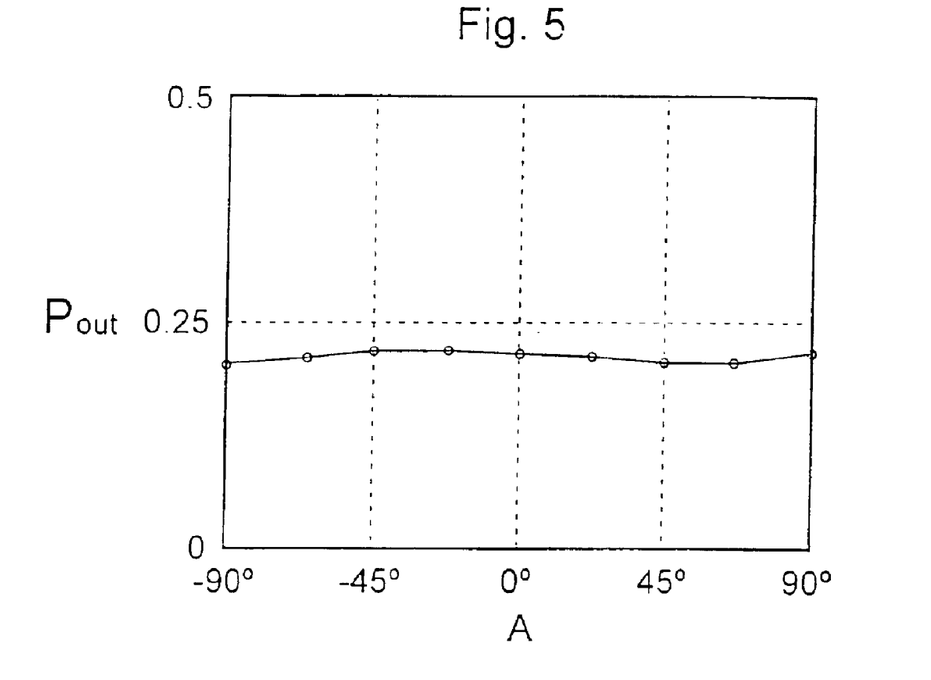
FIG. 5 is a graph of the normalized output power from the polarization stabilizer of FIG. 2 as a function of the azimuth of the polarization state of a linearly polarized input light beam.

To verify the effectiveness of the device for polarization stabilization, the azimuth of the linear polarization state of the input beam was rotated through 180° while maintaining the same input intensity.

FIG. 5 shows the results of this experiment. FIG. 5 plots the normalized output power $P_{out}$ integrated over frequency as a function of the azimuth of the linear input polarization state over the angular range −90° to +90°. As can be seen from the results, the output power is substantially independent of the input state polarization, with only a small variation occurring.

Figure 6:
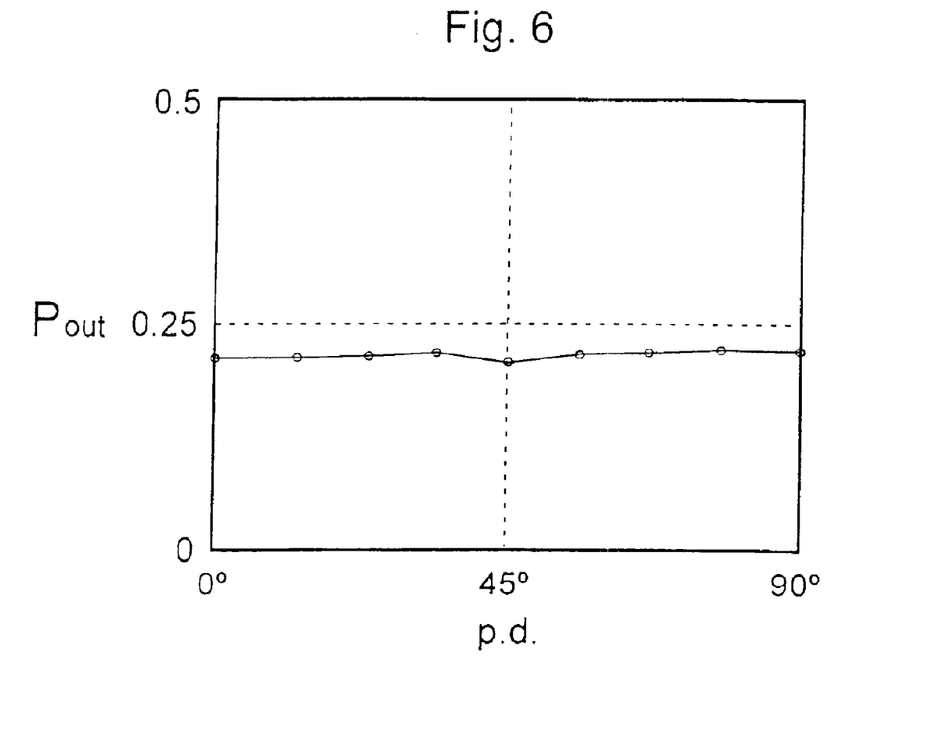
FIG. 6 is a graph of the normalized output power from the polarization stabilizer of FIG. 2 as a function of phase difference for input light having an arbitrary polarization state defined by a phase difference of between 0 and 90 between the linear orthogonal states into which any input polarization state can be decomposed.

FIG. 6 shows the results of a further experiment performed to verify the performance of the device. In this experiment, two orthogonal linear input polarization states of azimuth 0° and 90° respectively were superposed with a phase difference varied between 0° (input linear state at 45°) and 90° (input circular state). FIG. 6 plots these results in terms of the output power, $P_{out}$, against the phase difference, p.d. As can be seen from the results, the output power is substantially constant regardless of the phase difference.

The results of FIGS. 5 and 6 thus demonstrate the high degree of independence of the device output to the input polarization state. An input light signal of arbitrarily varying polarization is thus translated into an output light signal of defined stable polarization having an intensity directly proportional to the intensity of the input light signal.

Consequently, if the input light signal has constant power, the output light signal will also have constant power. Equally, if the input light source is amplitude modulated (but of unstable or varying polarization), the amplitude modulation will be faithfully reproduced in the polarization stabilized output. Still further, the losses of the device are relatively small, so that the output power is close to one quarter of the input power as predicted by equation (4). The experimental results of FIGS. 5 and 6 thus show that efficiency of the realized device is around 80–90% of the theoretical maximum.

Second Embodiment

Figure 7:
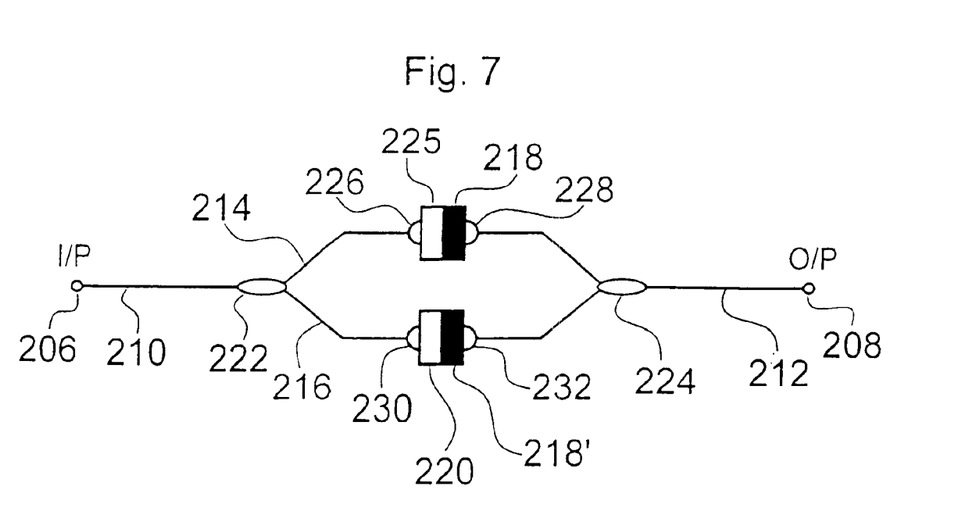
FIG. 7 shows a passive interferometric polarization stabilizer according to a second embodiment of the invention.

FIG. 7 shows a passive polarization stabilizer according to a second embodiment of the invention. The second embodiment is primarily an optical fiber device. An input optical fiber 210 leads from an input 206 to a 50/50 fiber coupler 222. On its output side, the fiber coupler 222 has first and second optical fiber sections defining parts of first and second interferometric arms 214 and 216 respectively. The fiber section of the first arm 214 leads to a collimating lens 226. Similarly, the second arm 216 leads to a further collimating lens 230. Cemented to the collimating lens 226 there is a half wave plate 225 and then a linear polarizer 218. The linear polarizer 218 is cemented in turn to a further collimating lens 228 which serves to de-collimate light received through the components 225 and 218 into a further section of optical fiber which also forms part of the first interferometric arm 214. Referring to the second interferometric arm 216, the collimating lens 230 is cemented to a phase shifter 220 which, in turn, is cemented to a further linear polarizer 218'. The linear polarizer 218' is cemented to a collimating lens 232 which serves to de-collimate light that has traversed the components 220 and 218' into a section of optical fiber which forms part of the second interferometric arm 216.

The half wave plate 225 is aligned at an azimuth of the slow axis of 0° and the linear polarizer 218 at an angle of 45°. The linear polarizer 218' in the second interferometric arm is similarly aligned at 45°. The two arms 214 and 216 then re-combine in a further 50/50 fiber coupler 224 and the light is then guided to an output 208 through a further optical fiber section 212.

The device of FIG. 7 is thus broadly functionally equivalent to that shown in FIG. 2. One difference of note is that the phase shifter 220 in FIG. 7 is, for convenience, placed in the second arm 216 rather than the first arm 214. In FIG. 2, an analogous arrangement would be achieved if the phase shifter 120 was moved to the other half of the free-space collimated beam. Similar to the device of FIG. 2, the device of FIG. 7 has the linear polarization performed in both arms of the interferometer, rather than in the output path, as in the configuration shown in FIG. 1. However, by contrast to the device of FIG. 2, two separate linear polarizer elements are used in FIG. 7, one in each arm, each linear polarizer having the same alignment.

It will thus be understood from the description of the devices of FIGS. 1, 2 and 7 that there is considerable design freedom on the precise arrangement of the components. It is necessary that the polarizing element be placed subsequent to the waveplate component. However, otherwise the placement of the polarizing element or elements can be selected freely. Similarly, the phase shifting element may be provided in either interferometer arm, or may be dispensed with if the coherence length of the input light does not require an enhancement of the optical path difference between the two interferometer arms. Moreover, it will be understood that different embodiments will adopt optical fiber or free space arrangements to varying degrees. Similarly, the device could in principle be implemented in planar waveguide technology, or any other technology in which interferometric devices can be fabricated.

Third Embodiment

Figure 8:
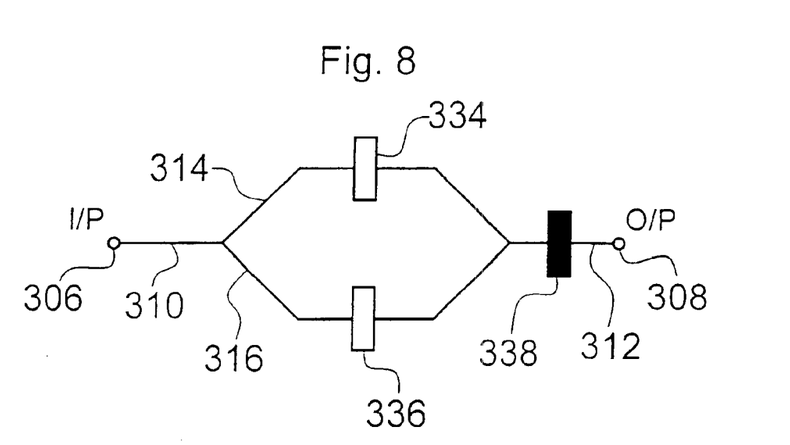
FIG. 8 shows a passive interferometric polarization stabilizer according to a third embodiment of the invention.

FIG. 8 shows a passive interferometric polarization stabilizer according to a third embodiment of the invention. The arrangement shown in FIG. 8 is in fact a generalization of the Mach-Zehnder interferometric configuration needed to provide passive polarization stabilization according to the principles of the invention. In fact, as will be understood from the following, the devices of FIG. 1, FIG. 2 and FIG. 7 are merely specific examples of an entire class of possible interferometric configurations generically defined by the FIG. 8 arrangement.

The device of FIG. 8 has a Mach-Zehnder configuration with first and second interferometric arms 314 and 316 respectively opening out from an input path 310 leading from an input 306 and closing down into an output path 312 which terminates in an output 308. In the first interferometric arm 314 there is placed an elliptical retarder 334. A further elliptical retarder 336 is placed in the second interferometer arm 316. In the output path 312 there is placed an elliptical polarizer 338.

An elliptical retarder is an optical element which has two orthogonal elliptical polarization eigenstates and which introduces a phase retardation between them. An elliptical polarizer is an optical element which transmits a particular elliptical polarization state without intensity loss and absorbs its orthogonal elliptical polarization state. Any desired degree of elliptical polarization can be realized with a linear polarizer placed between two quarter waveplates with orthogonal fast axes.

The fundamental condition to be satisfied by any embodiment of the present invention (whether Mach-Zehnder based or otherwise) is that, in order to obtain polarization stabilization, the polarization states in the two interferometer arms have to be orthogonal subsequent to the retardation action which may be performed either in one or both of the interferometer arms. Choice of a suitable polarizer then allows one of the two orthogonal states to be absorbed while the other is transmitted, thus stabilizing the output polarization state independent of the input polarization state.

By means of a Poincaré sphere representation (see reference [2]), many specific examples of configurations of the third embodiment can be envisaged, as now discussed. There is a one-to-one correspondence between the points on the Poincaré sphere and the polarization states. The linear states correspond to the equator and the circular states correspond to the two poles. Two orthogonal states correspond to two diametrically opposed points. The action of an elliptical retarder is represented on the Poincaré sphere by a rotation around the axis joining the two orthogonal eigenstates of the retarder. The angle of rotation is equal to the phase difference between the two eigenstates.

For generating some specific examples, the following discussion is restricted to the use of three different elliptical retarders, all corresponding to rotation of 180° around three orthogonal axes passing through the center of the Poincaré sphere. These three examples are (i) a half-wave plate with slow axis at 0°, (ii) a half-wave plate with slow axis at 45°, and (iii) a rotator of 90°. One of these elliptical retarders is considered to be present on the first interferometric arm, while no retarder is provided in the other arm. In other words, the further elliptical retarder 336 is omitted.

EXAMPLE 1

In Example 1, the elliptical retarder 334 takes the form of a half-wave plate ($\lambda/2$) with slow axis at 0° (in fact this is the same as in FIG. 1, FIG. 2 and FIG. 7). A half-wave plate with slow axis at 0° transforms into the orthogonal state any polarization state belonging to the great circle that passes through a circular state and the linear state at 45°, i.e. any elliptical state with a semi-axis at 45°. In order to obtain polarization stabilization, the elliptical polarizer thus has to project the polarization state into an elliptical state with semi-axis at 45°. Specific examples of elliptical polarizers which fulfil this function are a linear polarizer (LP) aligned at +45° or −45° (as in FIG. 1, FIG. 2 and FIG. 7) or a circular polarizer (CP).

Figure 9A:
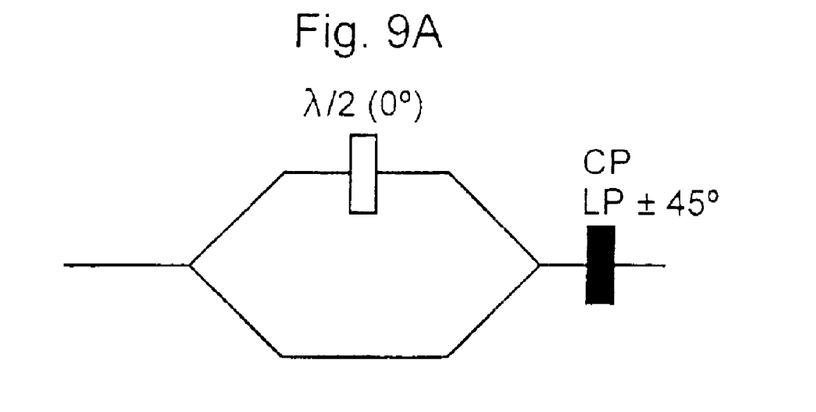
FIG. 9A shows a first set of specific examples of the third embodiment.

FIG. 9A shows each of these specific examples.

EXAMPLE 2

If the elliptical retarder is a half-wave plate ($\lambda/2$) with slow axis at 45° then this will transform into the orthogonal state any polarization state belonging to the great circle that passes through a circular state and the linear state at 0°, i.e. any elliptical state with a semi-axis at 0°. In order to obtain polarization stabilization, the elliptical polarizer will thus need to project the polarization state into an elliptical state with semi-axis at 0°. Specific examples of polarizers which will perform this function are a linear polarizer (LP) aligned at 0° or 90° or a circular polarizer (CP).

Figure 9B:
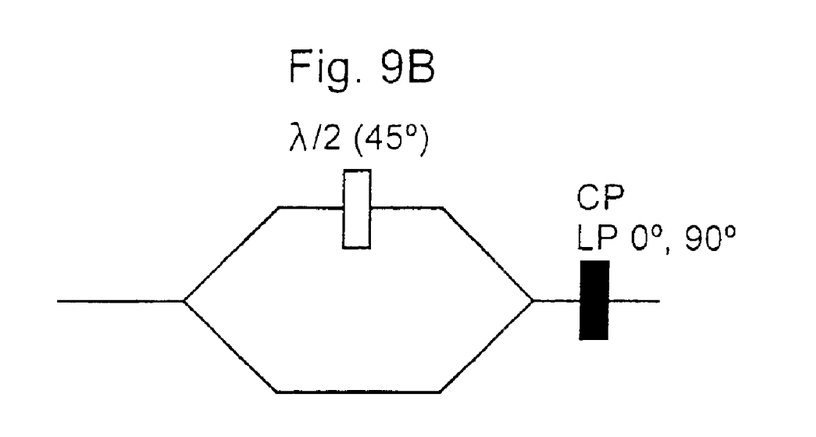
FIG. 9B shows a second set of specific examples of the third embodiment.

FIG. 9B shows each of these specific examples.

EXAMPLE 3

If a rotator (R) of 90° is used as the elliptical retarder this will transform into the orthogonal state any polarization state belonging to the equator, i.e. any linear state. In order to obtain polarization stabilization, the polarizer will thus need to project the polarization state into a linear state. Consequently, a linear polarizer with any alignment will work in this case.

Figure 9C:
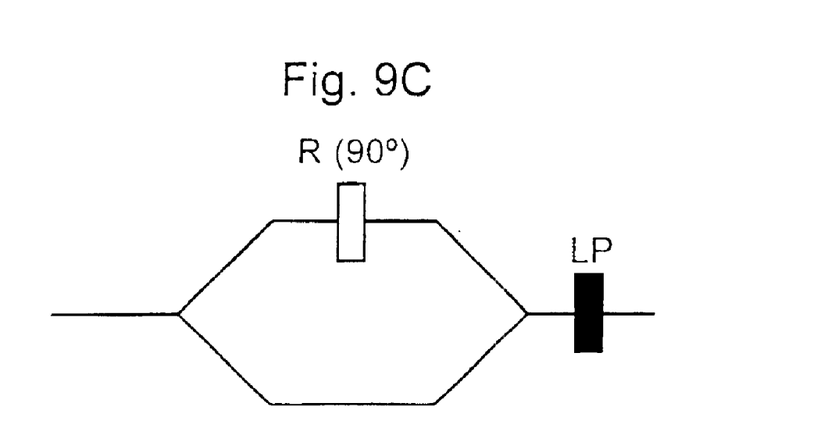
FIG. 9C shows a third set of specific examples of the third embodiment.

FIG. 9C shows these examples.

Fourth Embodiment

Figure 10:
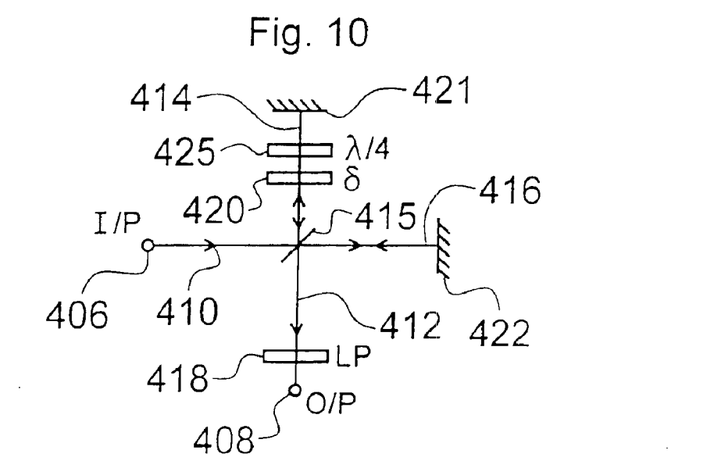
FIG. 10 shows a passive interferometric polarization stabilizer according to a fourth embodiment of the invention.

FIG. 10 shows a passive interferometric polarization stabilizer according to a fourth embodiment of the invention. As an alternative to the previously discussed embodiments, the device of the fourth embodiment is based on a Michelson interferometer configuration. An input 406 leads to an input path 410 which terminates at a beam splitter 415. One half of the input light signal is transmitted by the beam splitter, the other half being reflected, thus providing the light input into the first and second interferometer arms 414 and 416. The first and second arms 414 and 416 are bounded by respective mirrors 421 and 422 which reflect the incident light back on itself to the beam splitter 415 where the light signal components from the two arms are interferometrically re-combined into an output path 412 which terminates in an output 408. In the first arm 414 there is placed a quarter-wave plate 425 to give a total half-wave retardation as a result of the light transiting this element twice, once in each direction. The first arm 414 also includes a phase shifter 420. In the output path, a linear polarizer 418 is provided aligned at +/−45° relative to the quarter-wave plate 425. It will thus be understood that the device of FIG. 10 is the Michelson analogue of the Mach-Zehnder configuration of FIG. 2. This embodiment has been included to show that the principles of the invention can be implemented in any interferometer configuration.

System Example 1

Figure 11:
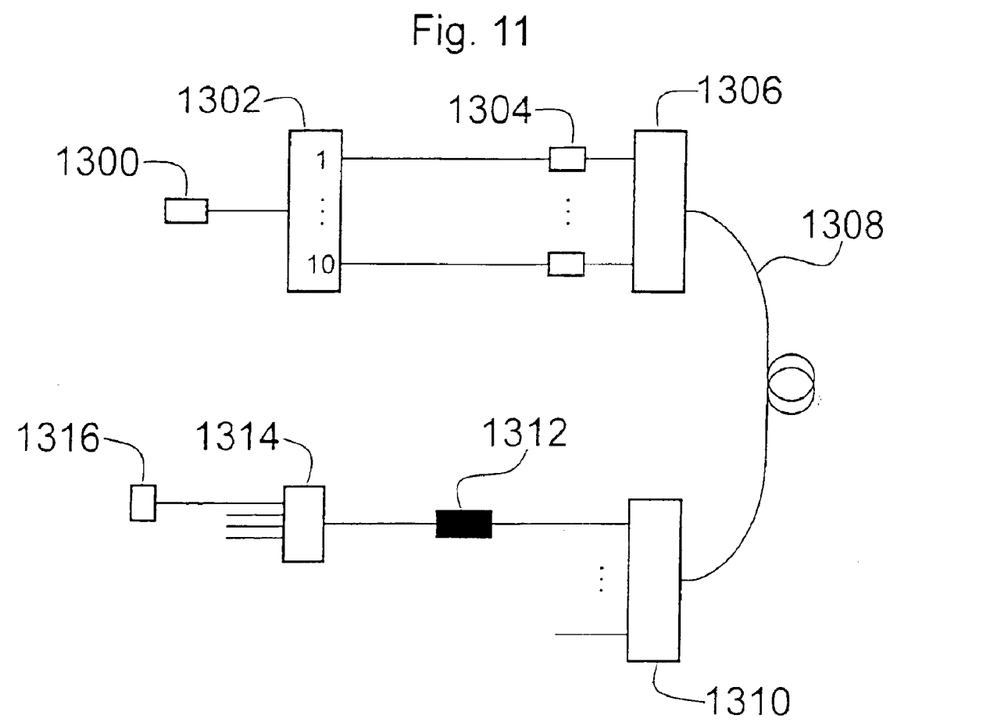
FIG. 11 shows an optical network incorporating a passive polarization stabilizer according to any of the first to third embodiments of the invention on the input side of an integrated optical splitter.

FIG. 11 shows a passive polarization stabilizer embodying the invention incorporated in a passive optical network. A broadband light source 1300 is connected to a WDM demultiplexer (demux) 1302. The broadband source 1300 has a bandwidth of 40 nm and is spectrum-sliced into 10 WDM channels of bandwidth 2 nm by the demux 1302. Each channel is independently modulated by respective modulators arranged in a modulator bank 1304. A WDM multiplexer (mux) then couples each of the ten channels into a single fiber link 1308. At the end of the fiber link 1308 there is arranged a WDM demultiplexer 1310 which separates the ten channels into separate fibers. Each channel may be directed to different recipients. One channel is illustrated as being supplied to a passive integrated optical splitter 1314 via a polarization stabilizing device 1312 according to any of the above-described embodiments of the invention. The passive polarization stabilizer 1312 has an optical path difference of 1 cm and functions to stabilize the response of the splitter. Downstream of the splitter 1314 there is illustrated a single user terminal 1316. The polarization stabilizing device 1312 is preferably arranged immediately prior to the splitter 1314 (or other polarization sensitive device) so that the input to the splitter is fully stabilized and not de-stabilized again by an intermediate connection between the polarization stabilizer output and the input of the splitter or other polarization sensitive element.

System Example 2

Figure 12:
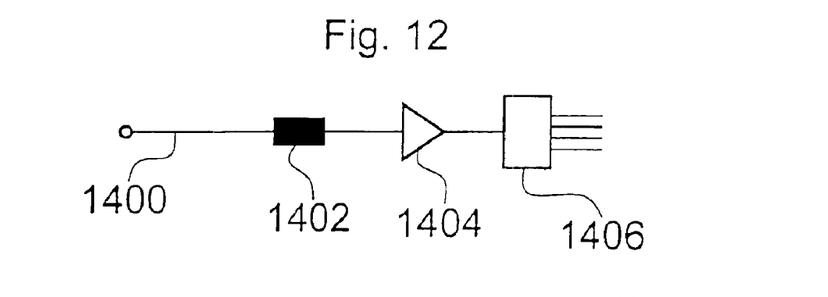
FIG. 12 shows a passive polarization stabilizer according to any of the first to third embodiments of the invention arranged on the input side of a semiconductor optical amplifier (SOA)

FIG. 12 shows a second system example incorporating a polarization stabilizing device 1402 according to any of the above-described embodiments. The polarization stabilizer 1402 is positioned to form a front-end for a semiconductor optical amplifier (SOA) 1404 receiving a broadband signal via a broadband channel 1400. The SOA 1404 is shown connected to an integrated optical splitter 1406. The stabilizer 1402 and SOA 1404 may advantageously be packaged as a single component.

System Example 3

Figure 13:
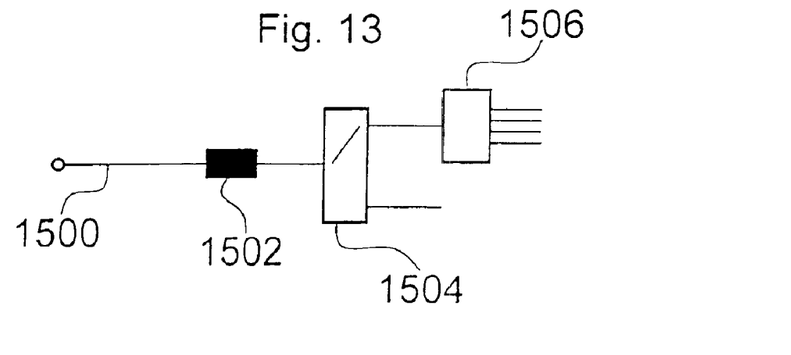
FIG. 13 shows a passive polarization stabilizer according to any of the first to third embodiments of the invention arranged on the input side of an electro-optical switch.

FIG. 13 shows a further system example of the use of a passive polarization stabilizing device according to any of the embodiments of the invention. A broadband channel 1500 leads to a passive polarization stabilizing device 1502 arranged immediately prior to an electro-optical switch 1504, which is a still further example of a device which is sensitive to the polarization of its input signal. The electro-optical switch may be based on electro-optic crystals or liquid crystals. One of the switched output channels of the electro-optical switch 1504 is shown connected to an integrated optical splitter 1506. The stabilizer 1502 and electro-optical switch 1504 may advantageously be packaged as a single component.

It will thus be understood that a passive polarization device according to embodiments of the invention may find general use in a variety of applications.

It will be appreciated that although particular embodiments of the invention have been described, many modifications/additions and/or substitutions may be made within the spirit and scope of the present invention.

References

1. JP-A-8248358
2. H G Jerrard: "Modern description of polarized light: matrix methods", Optics and Laser Technology, December 1982, pages 309–319

What is claimed is:

1. A polarization stabilizing device comprising:

an input light path for receiving a light signal having an arbitrary polarization state;

a divider arranged in the input light path to split the light signal into first and second components;

a first interferometric arm arranged to receive from the divider the first component of the light signal;

a second interferometric arm arranged to receive from the divider the second component of the light signal;

an output path for outputting the light signal from the first and second interferometric arms;

at least one polarizer arranged either in the first and second interferometric arms, or in the output path, to define an output polarization state for the light signal; and at least one elliptical retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer.

2. A polarization stabilizing device comprising:

an input light path for receiving a light signal having an a arbitrary polarization state;

a divider arranged in the input light path to split the light signal into first and second components;

a first interferometric arm arranged to receive from the divider the first component of the light signal;

a second interferometric arm arranged to receive from the divider the second component of the light signal;

an output path for outputting the light signal from the first and second interferometric arms;

at least one polarizer arranged either in the first and second interferometric arms, or in the output path, to define an output polarization state for the light signal;

at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer; and a phase shifter arranged in one of the first and second interferometric arms to ensure that there is an optical path difference between the first and second interferometric arms that is higher than a coherence length specified for the light signal.

3. A device according to claim 1, further comprising a combiner arranged to combine the first and second components of the light signal into the output path.

4. A device according to claim 1, wherein the at least one polarizer comprises a polarizing element placed in the output path.

5. A polarization stabilizing device comprising:
   an input light path for receiving a light signal having an arbitrary polarization state;
   a divider arranged in the input light path to split the light signal into first and second components;
   a first interferometric arm arranged to receive from the divider the first component of the light signal;
   a second interferometric arm arranged to receive from the divider the second component of the light signal;
   an output path for outputting the light signal from the first and second interferometric arms;
   at least one polarizer comprising a polarizing element placed in the first and second interferometric arms to define an output polarization state for the light signal; and
   at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer.

6. A polarization stabilizing device comprising:
   an input light path for receiving a light signal having an arbitrary polarization state;
   a divider arranged in the input light path to split the light signal into first and second components;
   a first interferometric arm arranged to receive from the divider the first component of the light signal;
   a second interferometric arm arranged to receive from the divider the second component of the light signal;
   an output path for outputting the light signal from the first and second interferometric arms;
   at least one polarizer arranged either in the first and second interferometric arms, or in the output path, to define an output polarization state for the light signal, wherein the at least one polarizer comprises a first polarizing element placed in the first interferometric arm and a second polarizing element placed in the second interferometric arm; and
   at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer.

7. A device according to claim 1, wherein the at least one elliptical retarder comprises a retarding element arranged in the first interferometric arm.

8. A polarization stabilizing device comprising:
   an input light path for receiving a light signal having an arbitrary polarization state;
   a divider arranged in the input light path to split the light signal into first and second components;
   a first interferometric arm arranged to receive from the divider the first component of the light signal;
   a second interferometric arm arranged to receive from the divider the second component of the light signal;
   an output path for outputting the light signal from the first and second interferometric arms;
   at least one polarizer arranged either in the first and second interferometric arms, or in the output path, to define an output polarization state for the light signal; and
   at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer, wherein the at least one retarder comprises a first retarding element arranged in the first interferometric arm and a second retarding element arranged in the second interferometric arm.

9. An optical component comprising:
   an optical device having an input for receiving an input light signal, the optical device being sensitive to the polarization state of the input light signal; and
   a polarization stabilizing device arranged to stabilize the polarization state of the input light signal prior to supplying the input light signal to the input of the optical device, the polarization stabilizing device comprising:
      an input light path for receiving a light signal having an arbitrary polarization state;
      a divider arranged in the input light path to split the light signal into first and second components;
      a first interferometric arm arranged to receive from the divider the first component of the light signal;
      a second interferometric arm arranged to receive from the divider the second component of the light signal;
      an output path for outputting the light signal from the first and second interferometric arms;
      at least one polarizer arranged either in the first and second interferometric arms, or in the output path, to define an output polarization state for the light signal; and
      at least one retarder arranged in at least one of the first and second interferometric arms to generate first and second polarization states in the first and second interferometric arms, respectively, that are a orthogonal to each other for at least one polarization state of the input light signal so that the first polarization state is transmitted by the at least one polarizer and the second polarization state is absorbed by the at least one polarize, thereby to output the light signal in the output polarization state defined by the at least one polarizer.

10. An optical component according to claim 9, wherein the optical device is a semiconductor optical amplifier (SOA).

11. An optical component according to claim 9, wherein the optical device is an electro-optic switch.

12. An optical component according to claim 9, wherein the optical device is an optical splitter.

13. An optical network comprising at least one polarization stabilizing device, the at least one polarization stabilizing device comprising:

an input light path for receiving a light signal having an arbitrary polarization state;

a divider arranged in the input light path to split the light signal into first and second components;

a first interferometric arm arranged to receive from the divider the first component of the light signal;

a second interferometric arm arranged to receive from the divider the second component of the light signal;

an output path for outputting the light signal from the first and second interferometric arms;

at least one polarizer arranged either in the first and second interferometric arms, or in the output path, to define an output polarization state for the light signal; and at least one retarder arranged in at least one of the first and second interferometric arms to generate first and second polarization states in the first and second interferometric arms, respectively, that are orthogonal to each other for at least one polarization state of the input light signal so that the first polarization state is transmitted by the at least one polarizer and the second polarization state is absorbed by the at least one polarizer, thereby to output the light signal in the output polarization state defined by the at least one polarizer.

14. A method of polarization stabilization, comprising:

inputting a light signal into an interferometer arrangement comprising first and second arms having an optical path difference therebetween greater than the coherence length of the light signal;

applying a retardation to the light signal in at least one of the arms so that subsequent to the retardation the light signal has orthogonal polarization states in the first and second arms for at least one polarization state of the input light signal; and applying a polarization with a polarizer so that one of the orthogonal polarization states is absorbed while the other is transmitted.

15. A method of polarization stabilization, comprising:

inputting a light signal into an interferometer arrangement comprising first and second arms having an optical path difference therebetween greater than the coherence length of the light signal;

applying a retardation to the light signal in at least one of the arms so that subsequent to the retardation the light signal has orthogonal polarization states in the first and second arms for at least one polarization state of the input light signal; and applying a polarization with a polarizer so that one of the orthogonal polarization states is absorbed while the other is transmitted, wherein the polarization is applied in the first and second arms.

16. A method according to claim 14, wherein the polarization is applied subsequent to recombination of the light signal after the first and second arms.

17. A method according to claim 14, further comprising recombining the light signal after the first and second arms in a manner that is insensitive to the polarization state of the light signal input to the interferometer arrangement.

* * * * *

UNITED STATES PATENT AND TRADEMARK OFFICE
CERTIFICATE OF CORRECTION

PATENT NO. : 6,941,032 B2
DATED : September 6, 2005
INVENTOR(S) : Mario Martinelli et al.

It is certified that error appears in the above-identified patent and that said Letters Patent is hereby corrected as shown below:

Column 12,
Lines 36-37, "an a arbitrary" should read -- an arbitrary --.

Column 14,
Lines 50-51, "are a orthogonal" should read -- are orthogonal --.
Line 55, "polarize," should read -- polarizer, --.

Signed and Sealed this

Twenty-first Day of March, 2006

JON W. DUDAS
*Director of the United States Patent and Trademark Office*